United States Patent
Yoon et al.

(10) Patent No.: US 7,406,022 B2
(45) Date of Patent: *Jul. 29, 2008

(54) OPTICAL RECORDING MEDIUM

(75) Inventors: Du-seop Yoon, Gyeonggi-do (KR);
Kyung-geun Lee, Gyeonggi-do (KR);
Byoung-ho Choi, Gyeonggi-do (KR);
Jae-seong Shim, Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 627 days.

This patent is subject to a terminal disclaimer.

(21) Appl. No.: 10/388,761

(22) Filed: Mar. 17, 2003

(65) Prior Publication Data

US 2003/0179689 A1    Sep. 25, 2003

(30) Foreign Application Priority Data

Mar. 15, 2002   (KR) ................................ 2002-14095

(51) Int. Cl.
*G11B 7/24* (2006.01)
(52) U.S. Cl. .................................. 369/275.3; 369/47.16
(58) Field of Classification Search ....................... None
See application file for complete search history.

(56) References Cited

U.S. PATENT DOCUMENTS

| | | | |
|---|---|---|---|
| 6,198,710 B1 * | 3/2001 | Hori et al. ................. | 369/59.24 |
| 6,201,778 B1 * | 3/2001 | Sensyu ..................... | 369/53.35 |
| 6,212,158 B1 * | 4/2001 | Ha et al. ................... | 369/275.4 |
| 6,233,219 B1 * | 5/2001 | Hori et al. ................. | 369/275.4 |
| 6,377,537 B1 * | 4/2002 | Maeda et al. ............. | 369/275.4 |
| 6,608,810 B2 * | 8/2003 | Minamino et al. ........ | 369/275.4 |
| 6,674,700 B2 * | 1/2004 | Minamino et al. ........ | 369/47.22 |
| 6,775,222 B2 * | 8/2004 | Aoki ........................ | 369/124.04 |
| 6,999,391 B2 * | 2/2006 | Heemskerk et al. ...... | 369/53.34 |
| 7,088,670 B2 * | 8/2006 | Kondo ...................... | 369/275.4 |
| 7,123,557 B2 * | 10/2006 | Heemskerk et al. ...... | 369/47.19 |
| 7,123,559 B2 * | 10/2006 | Lee et al. .................. | 369/47.27 |
| 7,123,568 B2 * | 10/2006 | Choi et al. ................ | 369/59.25 |
| 7,184,391 B2 * | 2/2007 | Lee et al. .................. | 369/275.4 |
| 2006/0187814 A1 * | 8/2006 | Yoon et al. ................ | 369/275.4 |
| 2006/0198288 A1 * | 9/2006 | Lee et al. .................. | 369/275.4 |
| 2006/0203644 A1 * | 9/2006 | Yoon et al. ................ | 369/47.48 |
| 2007/0041307 A1 * | 2/2007 | Yoon et al. ................ | 369/275.3 |

FOREIGN PATENT DOCUMENTS

JP      2000-231722      *   8/2000   .............. 369/275.4

* cited by examiner

*Primary Examiner*—Tan X Dinh
(74) *Attorney, Agent, or Firm*—Stein, McEwen & Bui, LLP

(57) ABSTRACT

An optical recording medium has a user data area and a lead-out area each having grooves and lands formed thereon. Wobbles are formed on at least one lateral surface of the grooves of the user data area and the lead-out area, and configured such that wobble characteristics are made different between the user data area and the lead-out area. Different types of the wobbles are formed on the grooves of either the user data area or the lead-out area, thereby preventing an optical pickup that performs recording/reproducing, from deviating from the user data area. Also, in a multi-layer optical recording medium, a whole area of a recording layer is configured to have the same condition, thereby preventing deterioration in reproducing and/or recording due to a difference in light power transmittance of another recording layer.

17 Claims, 6 Drawing Sheets

MIRROR

PIT

GROOVE

GROOVE MARK

OPTICAL RECORDING MEDIUM

CROSS-REFERENCE TO RELATED APPLICATIONS

This application claims the benefit of Korean Application No. 2002-14095, filed Mar. 15, 2002, in the Korean Industrial Property Office, the disclosure of which is incorporated herein by reference.

BACKGROUND OF THE INVENTION

1. Field of the Invention

The present invention relates to an optical recording medium, and more particularly, to an optical recording medium having wobbles formed on at least one lateral surface of grooves of a user data area and grooves of a lead-out area, and configured such that wobble characteristics between the user data area and the lead-out area are different from each other.

2. Description of the Related Art

In general, optical recording media are widely employed as information recording media for an optical pickup device recording/reproducing information on/from the optical recording media. The optical recording media are classified into read-only-memory (ROM) compact discs (CDs) and digital versatile discs (DVDs) according to information recording capacity. Further, a DVD disc which information is written on, erased, and read from, can be sub-divided into a digital versatile disc-random access memory (DVD-RAM) disc and a digital versatile disc-rewritable (DVD-RW) disc.

In a DVD-RAM or DVD-RW disc shown in FIG. 1, there is a lead-in area 10 in which read only data, such as a disc size, the number of track layers on a readable plane, or illegal copy preventing information, is recorded, a user data area 20 in which user data can be repeatedly read and/or written, and a lead-out area 30 in which other disc-related information is recorded.

As indicated by a portion "C" of FIG. 1, there are grooves 23 and lands 25 alternatively formed in the user data area 20 so as for the optical pickup device to perform recording and/or reproducing information marks 27 along a predetermined track. In FIG. 1, reference numeral 40 denotes a reproduction beam. From enlarged portions A and B of the lead-in area 10 and the lead-out area 30, it is confirmed that physical pits 15, which are the read only data, are formed thereon. Here, the lead-out area 30 is used for performing various functions. For example, the lead-out area 30 guards an optical pickup not to deviate from the user data area 20 while the optical pickup performs a recording/reproducing process.

In particular, as shown in FIG. 2, in a dual-layer optical recording medium having a first recording layer L0 and a second recording layer L1 of opposite track paths, the lead-out area 30 allows the optical pickup device to keep performing tracking during interlayer-jumping from an outermost circumference of the first recording layer L0 to another outermost circumference of the second recording layer L1 without deviating from the track paths. The opposite track paths are sequentially addressed from an inner circumference of the first recording layer L0 to an outer circumference thereof, and then from an outer circumference of the second recording layer L1 to an inner circumference thereof.

In a dual-layer optical recording medium, such as a ROM disc, an area serving as the lead-out area 30 varies according to a reproduction method of the second recording layer L1. In the dual-layer ROM disc having the opposite track paths, a middle area is separately provided at each of the outer circumferences of the first and second recording layers L0 and L1. However, in a case of a rewritable optical recording medium, both pits and grooves can be used. Therefore, in a case of dual layer rewritable optical recording media, a recording power is affected by a physical geometry of the first recording layer L0 during recording data. In other words, when recording is performed on the second recording layer L1, a recording light beam passes through the first recording layer L0, resulting in a difference in transmittance between pit portions and groove portions.

Light power was measured for an optical recording medium at a mirror area, a pit area, a groove area and a groove area with marks to simulate the light power depending on a difference in the transmittance according to various conditions of the first recording layer L0, as shown in FIGS. 3A through 3D. Here, the number of tracks trapped by a laser beam transmitted through a lens was taken into consideration.

Tables 1 and 2 list input parameters and items for experimentation. In Table 1, Rc represents reflectivity of a crystallized portion of a recording layer and Ra represents the reflectivity of an amorphous portion of the recording layer.

TABLE 1

| Parameter | Condition |
| --- | --- |
| Wavelength (nm) | 400 |
| Numerical Aperture (NA) | 0.65/0.85 |
| Minimum mark length (μm) | 0.275/0.194 |
| Modulation | EFM+ (Eight-to-Fourteen Modulation-plus) |
| Track pitch (TP) (μm) | 0.30, 0.34, 0.38 |
| Reflectivity (%) | Rc = 25, Ra = 5 |

TABLE 2

| Item | Factor | Example |
| --- | --- | --- |
| Dual recording layer | Structure of first recording layer | Mirror, pits, grooves, grooves with marks. |
| High NA | Number of tracks trapped by laser beam | 85 for 0.65 of NA 160 for 0.85 of NA |
|  | Incident angle of beam | 40.5° for 0.65 of NA 58.2° for 0.85 of NA |

FIG. 4 is a graph showing measurement results of the light power depending on the transmittance for the cases shown in FIGS. 3A, 3B, 3C and 3D. With reference to FIG. 4, according to a simulation result, a decrease in the light power is smallest in the mirror portion (graph line with solid squares), and the light power gradually decreases more in the order of a pit portion (graph line with solid diamonds), a groove portion (graph line with solid triangles) and a groove mark portion (graph line with solid circles). Therefore, as shown in FIG. 4, in the case of a dual layer disc, the transmittance varies according to the physical geometry of the first recording layer L0 while a rewritable optical recording medium can further affect the recording power during recording data. Accordingly, it is necessary to unify the physical geometry of the recording layer and to newly define the lead-out area or the middle area on such an optical recording medium.

SUMMARY OF THE INVENTION

To solve the above and/or other problems, it is an aspect of the present invention to provide an optical recording medium having a lead-out area configured to prevent an optical pickup from deviating from a user data area during recording and/or reproducing data without affecting a recording power of the optical pickup.

Additional aspects and advantages of the invention will be set forth in part in the description which follows and, in part, will be obvious from the description, or may be learned by practice of the invention.

Accordingly, to achieve the above and/or other aspects of the invention, an optical recording medium includes a user data area and a lead-out area each having grooves and lands formed thereon, and wobbles formed on at least one lateral surface of each of the grooves. The wobbles of the lead-out area have different characteristics from those of the user data area.

It is possible that the wobbles of the lead-out area are formed by modulating at least one feature of a frequency, a period (length), an amplitude and a phase of the wobbles of the user data area.

It is possible that at least one modulation method among a frequency modulation, a period (length) modulation, an amplitude modulation, a phase modulation, an HWM modulation and a combined modulation of wobble and non-wobble portions, is employed to form the wobbles of the user data area, and a modulation method different from that employed to form the wobbles of the user data area is employed to form the wobbles of the lead-out area, so that an optical pickup may not deviate from the user data area during recording and/or reproducing data.

It is possible that the wobbles may include addressing information or reference time information in a form of a phase locked loop (PLL).

It is possible that in addition to the different wobbles in the user data area and the lead out area, synchronization patterns of signals read from the grooves of the user data area and the lead-out area are different.

It is possible that in addition to the different wobbles in the user data area and the lead-out area, predetermined recording patterns are recorded on the outermost circumference of the optical recording medium to prevent an optical pickup from deviating from the user data area during recording and/or reproduction of data.

In the optical recording medium, two or more recording layers may be provided for multi-layer recording.

It is possible that in a case of multi-layer recording media, the two or more recording layers have different recording patterns in their lead-out areas.

It is possible that in the multi-layer recording media, the two or more recording layers have different synchronization patterns in their lead-out areas.

It is possible that in the multi-layer recording media, the lead-out area has a width of two or more times a maximum allowance of disc eccentricity.

In another aspect of the present invention, an optical recording medium includes a user data area and a lead-out area, in which predetermined recording patterns are recorded on an outermost circumference of the optical recording medium to prevent an optical pickup from deviating from the user data area during recording and/or reproducing data.

According to another aspect of the present invention, an optical recording medium includes a user data area and a lead-out area each having grooves and lands formed thereon, and different types of synchronization patterns are used in the lead-out area and the user data area.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
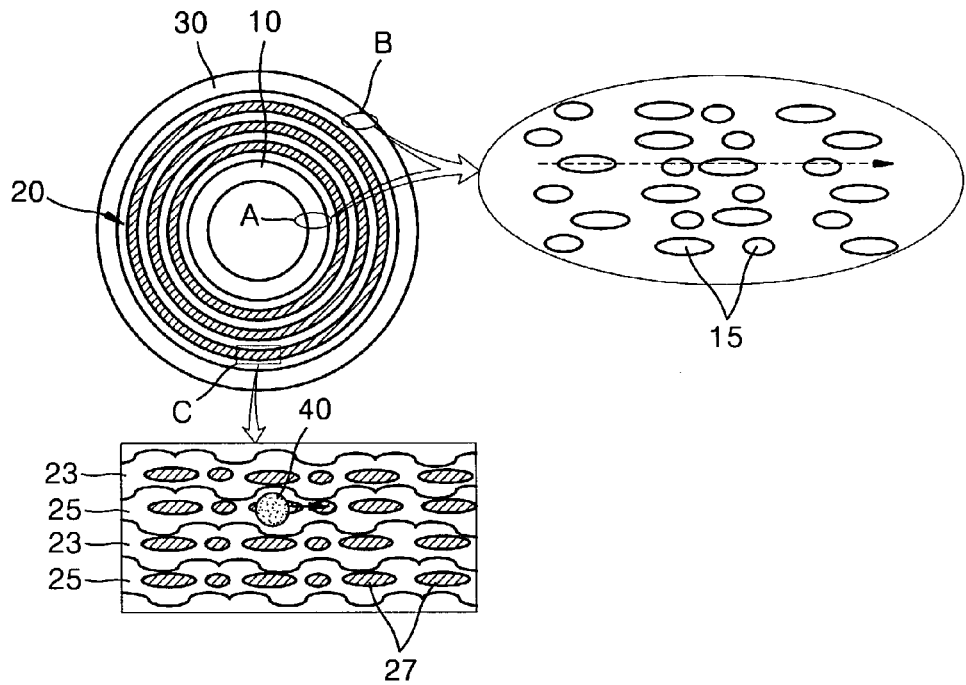
FIG. 1 shows a schematic diagram and an enlarged view of a conventional optical recording medium.
Figure 2:
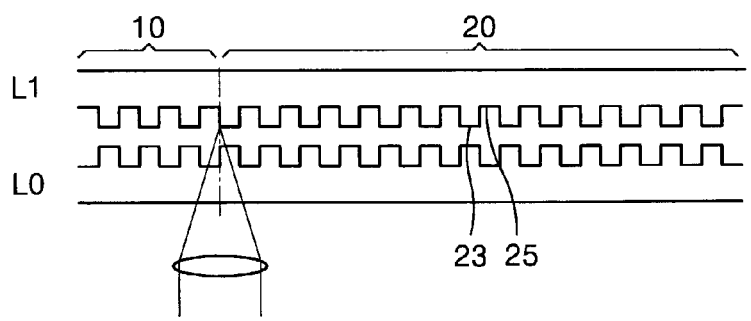
FIG. 2 is a partially cross-sectional view illustrating a conventional dual-layer optical recording medium.
Figure 3A:
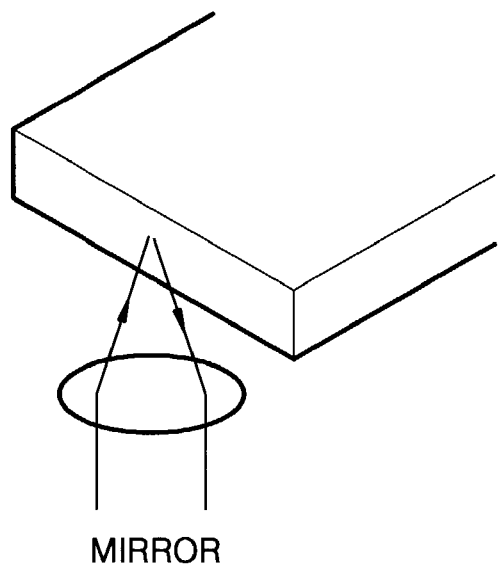
FIGS. 3A through 3D illustrate various portions of the conventional optical recording medium shown in FIG. 1.
Figure 3B:
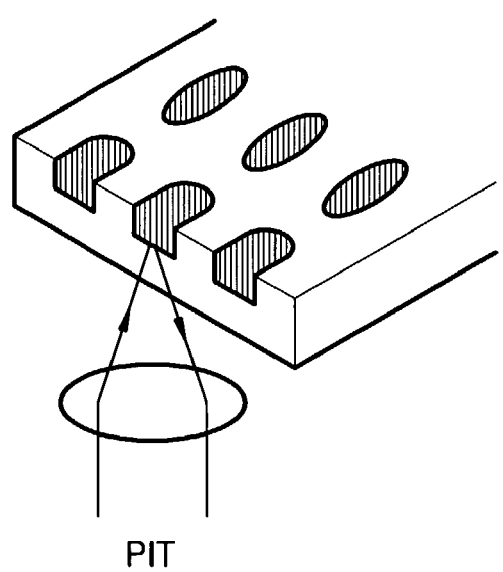
Figure 3C:
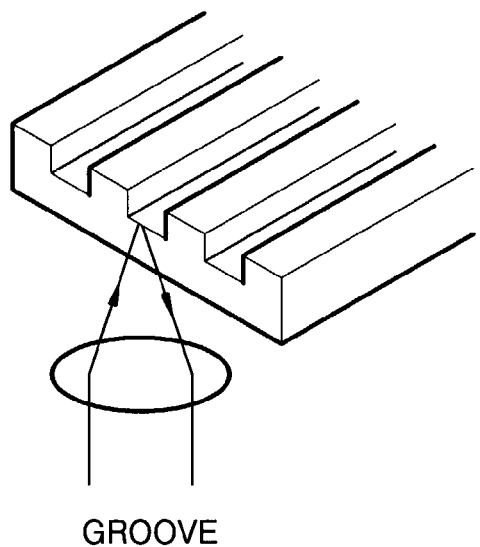
Figure 3D:
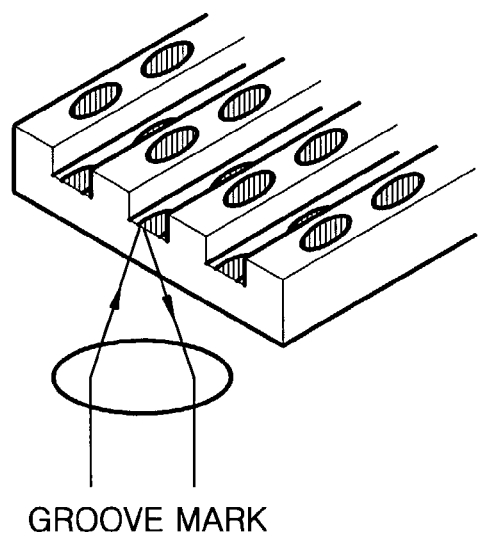
Figure 4:
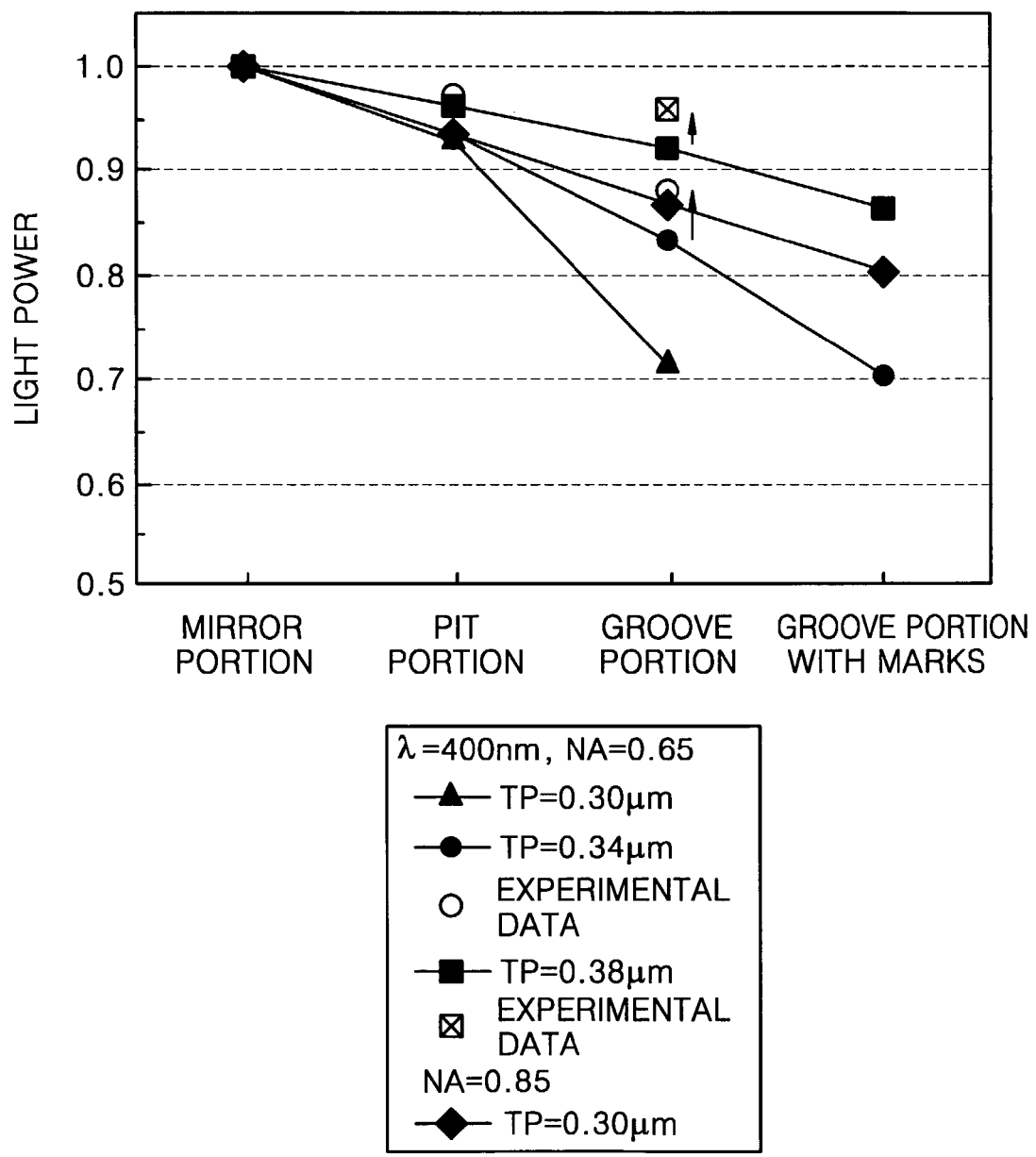
FIG. 4 illustrates an experimental result of light power in various cases of the conventional optical recording medium shown in FIGS. 3A through 3D.

Hereinafter, example embodiments of the present invention will be described in detail with reference to the attached drawings where like reference numerals refer to the like elements throughout. The embodiments are described below to explain the present invention by referring to the figures and to more completely explain the present invention to anyone skilled in the art. The present invention is not restricted to the following embodiments, and many variations are possible within the spirit and scope of the present invention, the scope of which is defined in the claims and their equivalents.

Figure 5:
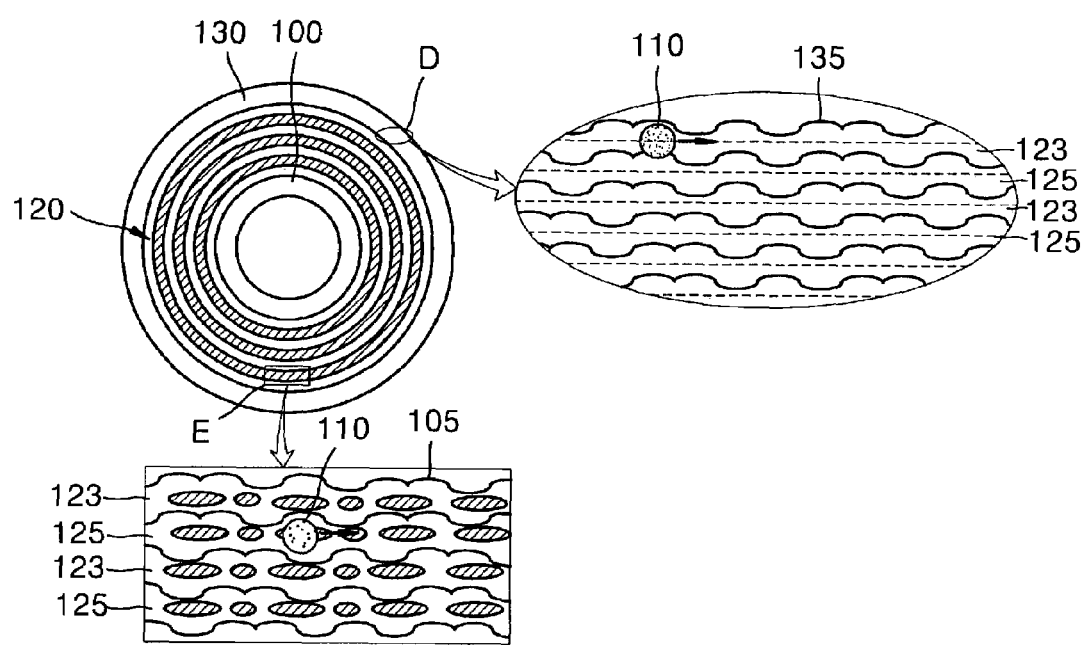
FIG. 5 is a schematic view of and an enlarged view of an optical recording medium according to an embodiment of the present invention.

Referring to FIG. 5, an optical recording medium according to an embodiment of the present invention includes a lead-in area 100, a user data area 120 and a lead-out area 130, each area having grooves 123 and lands 125 formed therein. Wobbles 105 and 135 are formed on at least one lateral surface of each of grooves 123 and lands 125 in the user data area 120 and the lead-out area 130, respectively. Here, a portion "E" of the user data area 120 and a portion "D" of the lead-out area 130 are enlarged and shown in FIG. 5. Reference numeral 110 denotes a laser beam.

As described above, the lead-out area 130 has a guard function that prevents an optical pickup (not shown) from deviating from the user data area during recording and/or reproducing data, and in a case of a dual-layer disc, the lead-out area can be used for controlling the optical pickup to keep/maintain tracking while interlayer-jumping from an outermost circumference of the optical recording medium.

In the optical recording medium, to provide the guard function, the wobbles 135 in the lead-out area 130, which are different from the wobbles 105 in the user data area 120, are formed in an area beyond a predetermined radius of the optical recording medium (for example, a lead-out area). In other words, at least one kind of features including periods (lengths), frequencies, amplitudes and phases of the wobbles 105 and 135 are modulated in the user data area 120 and the lead-out area 130. Hereinafter, "period" is referred to as "length." In addition, a combination modulation method of a wobble portion and a non-wobble portion having a predetermined length, or an HWM (Harmonic Wave Modulation)

method may be employed. The phase modulation is exemplified by QPSK (Quadrature Phase Shift Keying) in which phases of a wobble signal is shifted by 90 degrees. The frequency modulation is exemplified by MSK (Minimum Shift Keying) in which only frequencies of some sections of continuous wobbles vary. The HWM method is exemplified by a serration modulation.

Among the above-stated modulation methods, the same modulation method may be employed to modulate data in the user data area 120 and the lead-out area 130. For example, the wobbles 135 of the lead-out area 130 can be formed by modulating at least one feature of the frequency, the period (length), the amplitude and the phase of the wobbles 105 of the user data area 120 as follows. In a case of modulating the frequencies of the wobbles 105 and 135, the wobble 135 of the lead-out area 130 may be formed to have a frequency of n times (where n is a real number), a basic frequency of the wobble 105 of the user data area 120. For example, to serve as a guard, the lead-out area 130 may be configured such that the wobble 135 has a frequency of 2 times that of the user data area 120.

Further, in a case of modulating a wobble period (length) T the wobble 105 of the user data area 120 and the wobble 135 of the lead-out area 130 can, for example, have periods (lengths) 200T and 100T, respectively, so that the lead-out area 130 can be discriminated from the user data area 120. Here, after completion of manufacturing a disc, 00h as pattern data may be recorded in the lead-out area 130. Accordingly, the 00h pattern data is read out by a channel 1 (Ch1) during a recording/reproducing process, and the wobble frequency and/or period can be read out by a channel 2 (Ch2), thereby allowing double discrimination of the lead-out area 130 from the user data area 120.

On the other hand, different modulation methods may be employed to the wobbles 105 and 135 of the user data area 120 and the lead-out area 130, which will now be described in more detail.

First, at least one modulation method among the frequency modulation, period (length) modulation, amplitude modulation, phase modulation, HWM modulation and combined modulation methods of wobble and non-wobble portions, may be employed to the wobbles 105 of the user data area 120, and a modulation method different from that employed to the wobbles 105 of the user data area 120 may be employed to the wobbles 135 of the lead-out area 130. Hereinafter, "period modulation" is referred to as "length modulation." For example, the wobbles 105 of the user data area 120 can be formed by the frequency modulation method while the wobbles 135 of the lead-out area 130 can be formed by the phase modulation method.

Second, a mixed modulation method of mixing (combining) two or more modulation methods among the frequency modulation, period modulation, amplitude modulation, phase modulation, HWM modulation and combined modulation methods of the wobble and non-wobble portions, may be employed to the wobbles 105 of the user data area 120, and at least one single modulation method among the frequency modulation, period modulation, amplitude modulation, phase modulation, HWM modulation and combined modulation methods of the wobble and non-wobble portions, may be employed to the wobbles 135 of the lead-out area 130. For example, the wobbles 105 of the user data area 120 can be formed by a mixed modulation method of combining the HWM method and the phase modulation method while the wobbles 135 of the lead-out area 130 can be formed by the phase modulation method.

Third, at least one single modulation method may be employed to the wobbles 105 of the user data area 120, and the mixed modulation method may be employed to the wobbles 135 of the lead-out area 130, which is opposite to the above-described second case. For example, the wobbles 105 of the user data area 120 can be formed by the frequency modulation method while the wobbles 135 of the lead-out area 130 can be formed by the mixed modulation method of the frequency modulation, e.g., MSK, method and the amplitude modulation method.

Fourth, the mixed modulation method of two or more modulation methods may be employed to the wobbles 105 of the user data area 120, and another mixed modulation method different from that employed to the wobbles 105 of the user data area 120 may be employed to the wobbles 135 of the lead-out area 130.

As described above, different wobble modulation methods are employed to the user data area 120 and the lead-out area 130, thereby providing the guard function to the lead-out area 130. In other words, at least one modulation method among the frequency modulation, period modulation, amplitude modulation, phase modulation, HWM modulation and combined modulation methods of the wobble and non-wobble portions, may be employed to the wobbles 105 of the user data area 120, and another modulation method different from that employed to the wobbles 105 of the user data area 120 may be employed to the wobbles 135 of the lead-out area 130, thereby achieving the guard function.

In an optical medium according to another embodiment of the present invention, when formatting the optical medium, a predetermined recording pattern can be recorded in the lead-out area 130, thereby discriminating the lead-out area 130 from the user data area 120.

The predetermined recording pattern may be, for example, a recording pattern used in the user data area 120. That is to say, among recording patterns used in the user data area 120, the predetermined recording pattern, for example, a 00h pattern, can be repeatedly recorded in the lead-out area 130, thereby allowing the optical pickup to recognize the lead-out area 130.

Alternatively, the recording pattern not used in the user data area 120 is recorded in the lead-out area 130, thereby allowing the optical pickup to recognize the lead-out area 130. For example, the 00h pattern is recorded in the user data area 120 and an FFh pattern as another pattern is recorded in the lead-out area 130. Therefore, in this case, the recording patterns recorded on the lead-out area 130 are different from those used in the user data area 120. Here, the 00h and FFh patterns are recording patterns based on a hexadecimal system.

Figure 6:
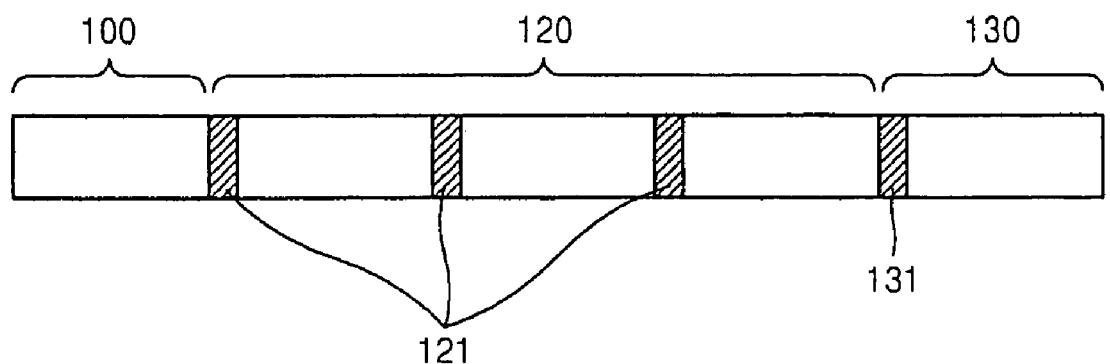
FIG. 6 shows synchronization patterns in an optical recording medium according to an example embodiment of the present invention.

According to another embodiment of the present invention, the optical medium includes the user data area 120 and the lead-out area 130, each having the grooves 123 and the lands 125. Different types of synchronization patterns (to be abbreviated as "sync patterns" hereinafter) are used in the user data area 120 and the lead-out area 130. As shown in FIG. 6, synchronization patter 121 in the user data area 120 may be different from a synchronization pattern 131 in the lead-out area 130. Thus, the lead-out area 130 is discriminated from the user data area 120 by recognizing the sync patterns 121 and 131, thereby preventing the optical pickup from deviating from the user data area 120 during the recording/reproducing process.

Here, a width of the lead-out area 130 in a radial direction may be determined to be two or more times the maximum allowance of the disc eccentricity, and it is possible that the width is 100 μm or greater.

Figure 7:
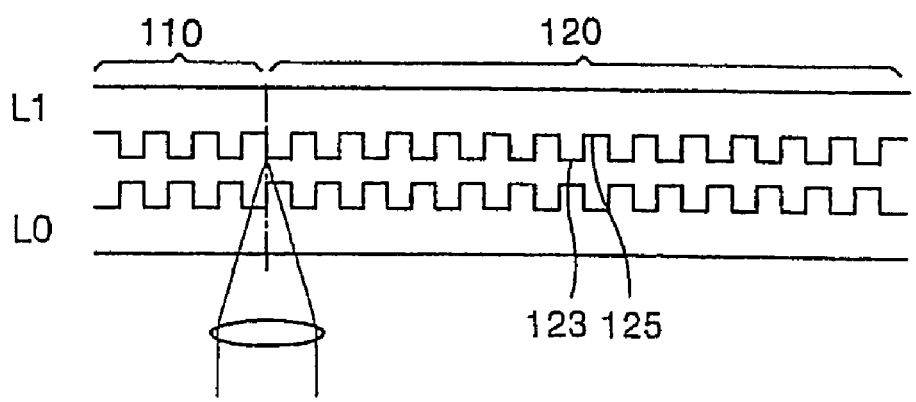
FIG. 7 is a partially cross-sectional view illustrating a dual-layer optical recording medium according to an example embodiment of the present invention.

Also, according to an aspect of the present invention a multi-layer optical recording medium includes two or more recording layers as follows. For example, a dual-layer optical recording medium, as shown in FIG. 7, has a first recording layer L0 and a second recording layer L1, and includes the user data area 120 and the lead-out area 130, each having the grooves 123 and the lands 125.

The wobbles 105 and 135 are formed on at least one lateral surface of each of the grooves 123 and the lands 125. The wobbles 105 and 135 may include addressing information or reference time information, e.g., phase locked loop (PLL). To prevent the optical pickup from deviating from the user data area 120, the wobbles 105 and 135 formed in the user data area 120 and the lead-out area 130, respectively, may be modulated into different types of wobbles.

However, a multi-layer optical recording medium may include two or more recording layers. Further, in such a multi-layer optical recording medium having two or more recording layers, different recording patterns are formed on each lead-out area 130 of the respective recording layers, thereby discriminating the respective recording layers. For example, in a dual-layer optical recording medium, the 00h pattern may be recorded on the lead-out area 130 of a first recording layer, and the FFh pattern may be recorded on the lead-out area 130 of a second recording layer. By doing so, the recording patterns are read out by a channel 1 (Ch1) and wobble signals based on the wobble modulation method are read out by a channel 2 (Ch2), during recording and/or reproducing on/from the multi-layer optical recording medium.

Further, to maintain tracking during interlayer-jumping, the width of the lead-out area 130 may be determined to be two or more times the maximum allowance of the disc eccentricity. If the disc eccentricity occurring according to injection in manufacturing a disc is approximately 50 μm, the width of the lead-out area 130 is determined to be 100 μm or greater.

According to another embodiment of the present invention, to discriminate the respective recording layers in the multi-layer optical recording medium having the two or more recording layers, different sync patterns may be used for each recording layer in the lead-out area 130. By using the wobbles according to the embodiments of the present invention, a whole area of each recording layer can be configured to have the same condition, thereby providing a uniform transmittance of the respective recording layers.

In the multi-layer optical recording medium, the whole area, including the user data area 120 and the lead-out area 130, is formed into grooves, so that the whole area of the first recording layer is configured to have the same condition, thereby preventing deterioration in the reproducing and/or recording process due to a difference in light power transmittance of the first recording layer.

Also, different modulation methods are employed to form the wobbles 105 and 135 of the user data area 120 and the lead-out area 130, respectively, or synchronization patterns of signals read from the user data area 120 and the lead-out area 130 are made different, thereby providing the guard function to prevent the optical pickup from deviating from the user data area 120 during recording and/or reproducing of data.

While this invention has been particularly shown and described with reference to example embodiments thereof, it will be understood by those skilled in the art that various changes in form and details may be made therein without departing from the spirit and scope of the invention as defined by the appended claims and their equivalents.

What is claimed is:

1. An optical recording medium comprising:
    a user data area having grooves and lands formed thereon; and
    a first area other than the user data area, having grooves and lands formed thereon,
    wherein wobbles are formed on at least one lateral surface of each of the grooves and the lands in the user data area and the first area, respectively, and
    wherein the wobbles of the user data area are modulated by a combination modulation method, and the wobbles of the first area are modulated by a single modulation method.

2. The optical recording medium according to claim 1, wherein the first area is a lead out area.

3. The optical recording medium according to claim 2, wherein the wobbles of the lead-out area include addressing information or reference time information in a form of a phase locked loop (PLL).

4. The optical recording medium according to claim 2, wherein the user data area and the lead-out area comprise:
    synchronization patterns formed on the grooves of the user data area and the lead-out area, and the synchronization pattern of the user data area is different from that of the lead-out area.

5. The optical recording medium according to claim 2, wherein the optical recording medium is readable in an optical pickup, and the wobbles comprise:
    recording patterns recorded on an outermost circumference of the optical recording medium to prevent the optical pickup from deviating from the user data area during data recording and/or data reproduction.

6. The optical recording medium according to claim 2, wherein the combination modulation method comprises at least two modulation methods among frequency modulation, period modulation, amplitude modulation, phase modulation, HWM modulation, and combined modulation methods of the wobble and non-wobble portions, and the single modulation method comprises one modulation method employed among frequency modulation, period modulation, amplitude modulation, phase modulation, HWM modulation, and combined modulation methods of the wobble and non-wobble portions.

7. The optical recording medium according to claim 6, wherein the wobbles of the lead-out area comprise:
    addressing information or reference time information in a form of a phase locked loop (PLL).

8. The optical recording medium according to claim 6, wherein the user data area and the lead-out area comprise:
    synchronization patterns formed on the grooves of the user data area and the lead-out area, and the synchronization pattern of the user data area is different from that of the lead-out area.

9. The optical recording medium according to claim 6, wherein the wobbles comprise:
    predetermined recording patterns recorded on an outermost circumference of the optical recording medium to prevent the optical pickup from deviating from the user data area during data recording and/or data reproduction.

10. The optical recording medium according to claim 2, wherein the wobbles of the lead-out area comprise:
    addressing information or reference time information in a form of a phase locked loop (PLL).

11. The optical recording medium according to claim 2, wherein the user data area and the lead-out area comprise:

synchronization patterns formed on the grooves of the user data area and the lead-out area, and the synchronization pattern of the user data area is different from that of the lead-out area.

12. The optical recording medium according to claim 2, wherein the optical recording medium is readable in an optical pickup, and the wobbles comprise:
predetermined recording patterns recorded on an outermost circumference of the optical recording medium to prevent the optical pickup from deviating from the user data area during data recording and/or data reproduction.

13. The optical recording medium according to claim 2, further comprising
two or more recording layers for multi-layer recording.

14. The optical recording medium according to claim 13, wherein:
each recording layer comprises,
the user data area and the lead-out area; and
the two or more recording layers comprises,
different recording patterns in respective lead-out areas.

15. The optical recording medium according to claim 14, wherein the lead-out area has a width of two or more times a maximum allowance of disc eccentricity in a radial direction of the optical recording medium.

16. The optical recording medium according to claim 1, wherein the optical recording medium is recordable, and recording is performed on the grooves and/or the lands.

17. An apparatus for reproducing data from an optical recording medium comprising a user data area having grooves and lands formed thereon and a first area other than the user data area, having grooves and lands formed thereon, the apparatus comprising:
a pickup unit to emit light to transfer data with respect to the optical recording medium; and
a controller to control the pickup unit to reproduce data recorded in the user data area,
wherein wobbles are formed on at least one lateral surface of each of the grooves and the lands in the user data area and the first area, respectively, the wobbles of the user data area are modulated by a combined modulation method, and the wobbles of the first area are modulated by a single modulation method.

* * * * *